United States Patent [19]
Litzenberger

[11] 3,730,558
[45] May 1, 1973

[54] TRAILER HITCH SAFETY DEVICE
[76] Inventor: Carl R. Litzenberger, Endicott, Wash. 99125
[22] Filed: Feb. 28, 1972
[21] Appl. No.: 229,647

[52] U.S. Cl. ................................ 280/511, 280/515
[51] Int. Cl. .............................................. B60d 1/06
[58] Field of Search ........................... 280/511, 515

[56] References Cited
UNITED STATES PATENTS

| | | | |
|---|---|---|---|
| 2,697,618 | 12/1954 | Hulstedt | 280/515 |
| 2,705,157 | 3/1955 | Dail | 280/515 |
| 3,047,839 | 7/1962 | Brown | 280/511 |
| 3,479,057 | 11/1969 | Miller | 280/511 |
| 3,522,958 | 8/1970 | Lusignan | 280/511 |

Primary Examiner—Leo Friaglia
Assistant Examiner—J. D. Rubenstein
Attorney—Greek Wells et al.

[57] ABSTRACT

A safety device for preventing the inadvertent disengagement of the socket from the ball in a ball and socket type trailer hitch. The safety device has an upright standard affixed to the hitch with a stop mounted on the standard for pivotable movement to a position directly over the ball and socket to prevent their disengagement. The standard and stop have vertical surfaces that are aligned with each other when the stop extends directly over the socket. A vertically oriented lever is pivotally mounted on the stop for engaging the vertical surfaces to prevent the stop from being pivoted.

7 Claims, 4 Drawing Figures

PATENTED MAY 1 1973　　　3,730,558

TRAILER HITCH SAFETY DEVICE

BACKGROUND OF THE INVENTION

This invention relates to hitches for connecting a towing vehicle to a vehicle to be towed and more particularly to mechanisms for preventing the hitch from inadvertently disconnecting.

The ball and socket type trailer hitch has become quite popular because of the turning flexibility it provides between the towing vehicle and the towed vehicle. Numerous types of safety devices have been proposed for preventing the inadvertent disengagement of the socket from the ball. Should such a disengagement occur while the vehicles are moving, a very serious accident could result causing substantial bodily injury and property damage. Numerous provisions have been suggested to minimize the possibility of such unintended disengagement. Examples of such safety devices are disclosed in U.S. Pat. Nos. 2,697,618; 3,479,057 and 3,522,958.

The principle object of this invention is to provide a reliable safety device for a ball and socket type trailer hitch.

An additional object of this invention is to provide a very simple and easily constructed safety device for a socket and ball type of hitch arrangement for preventing the socket from unintentionally disengaging from the ball.

These and other objects and advantages of this invention will become apparent upon reading of the following detailed description of a preferred embodiment.

BRIEF DESCRIPTION OF THE DRAWINGS

A preferred embodiment of this invention is illustrated in the accompanying drawings, in which.

DETAILED DESCRIPTION OF A PREFERRED EMBODIMENT

Figure 1:
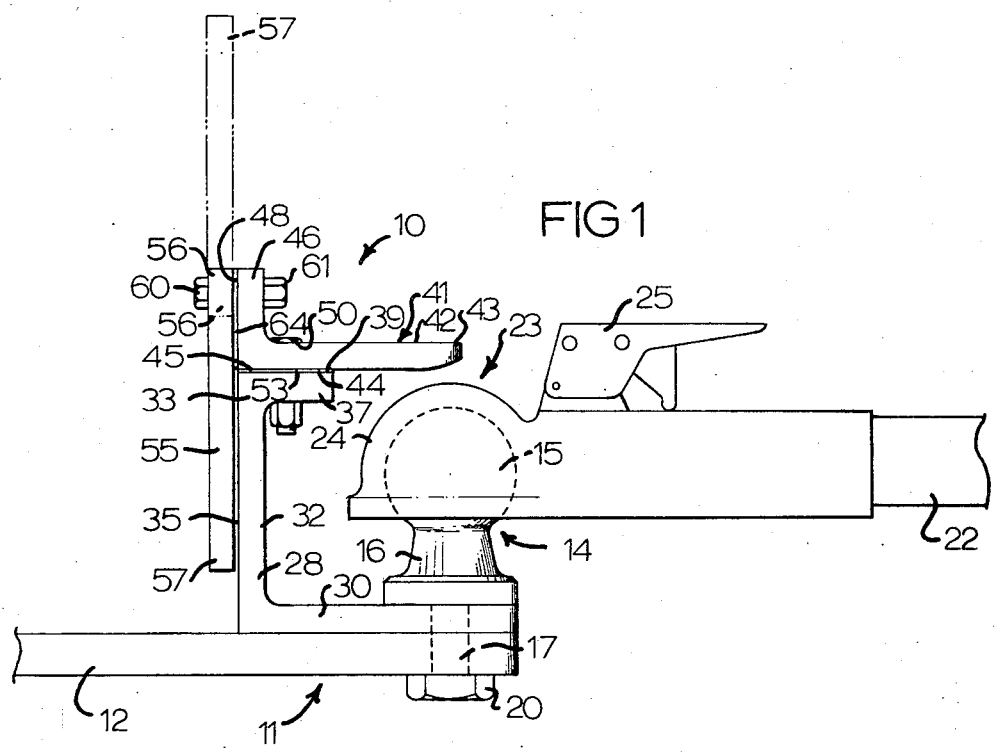
FIG. 1 is a fragmentary side view of a ball and socket type hitch showing a safety device embodying the principle features of this invention to prevent the unintentional disengagement of the socket from the ball.
Figure 2:
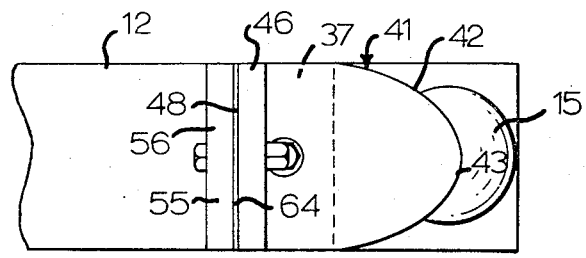
FIG. 2 is a plan view of the safety device illustrated in FIG. 1 showing the safety device in a locking position to prevent socket from disengaging with the ball.
Figure 3:
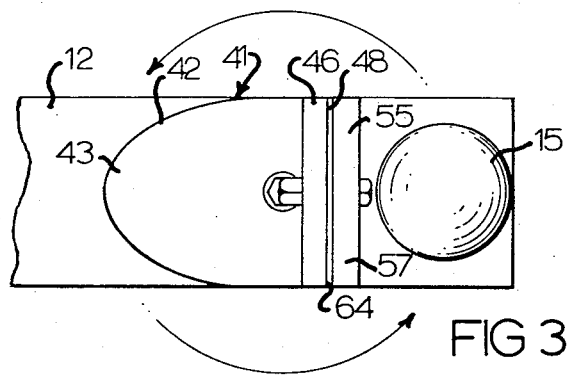
FIG. 3 is a plan view similar to FIG. 2 except showing the safety device in an unlocking position enabling the user to readily disconnect the socket from the ball.
Figure 4:
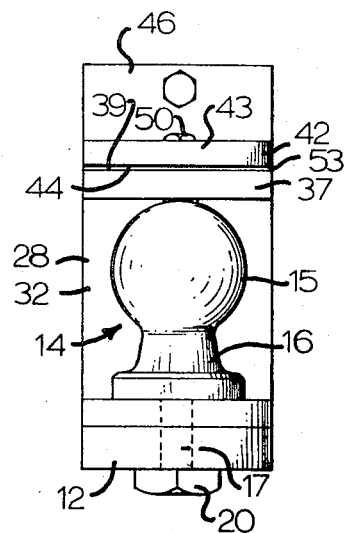
FIG. 4 is a front view of the safety device.

Referring now to the drawing, there is illustrated in FIG. 1 a safety device generally designated with the numeral 10 for use in conjunction with a hitch 11 that interconnects a towing vehicle with a vehicle to be towed. The hitch 11 includes a bracket 12 affixed to the rear of the towing vehicle that extended rearward in a substantially horizontal orientation. The hitch 11 has a male connecting member 14 in the form of a ball 15. The ball 15 is formed integrally on a pedestal 16. The pedestal 16 has a threaded shaft 17 that extends downward through the end of the bracket 12 and is fixed thereto with a nut 20.

The hitch 11 further includes a female hitch member 23 affixed to a tongue 22 of a vehicle to be towed in which the female member includes a socket 24 that receives the ball 15. As part of the socket 24 a conventional locking member 25 is provided to hold the socket onto the ball.

The purpose of the safety device 10 is to prevent the unintentional disengagement of the socket 24 from the ball 15 and thereby prevent the unintentional disconnection of the hitch. The safety device 10 includes a standard 28 that is mounted on the bracket 12. The standard 28 includes a base 30 that is rather elongated having a forward end that extends underneath the pedestal 16 and has a hole therein (not shown) for receiving the shaft 17 therethrough. The standard 28 has an upright section 32 terminating in an upper end 33 that is spaced from the ball 15. The upright section 32 has a back vertical surface 35. The upper end 33 has a forward projection 37 that forms a top horizontally oriented surface 39 at the upper end 33 of the standard.

An L-shaped stop 41 is mounted on the upper end 33 having a horizontally extending section 42 that extends from the standard to prevent the disengagement of the socket 24 from the ball 15. The horizontally extending section 42 is of sufficient length to extend from the standard over the socket ball to a front end 43. The section 42 has a horizontal bottom surface 44 that is substantially flush with the top flat surface 39 of the upper end 33. The horizontal section has a rear end 45 that flows into a vertical section 46 that extends upward from the horizontal section 42. The vertical section 46 has a back vertical surface 48.

The stop 41 is pivotally mounted on the standard 28 for pivotal movement about a bolt 50 that extends through the section 42 and downward through forward projection 37. The bolt 50 defines a vertical axis about which the stop pivots. The stop 41 is positioned on the standard 28 so that when the front end 43 of the stop extends directly over the ball and socket (operative position) the back vertical surfaces 35 and 48 lie in the same or substantially the same vertical plane and may be said to be angularly aligned with each other about the vertical axis.

It is desirable to construct the standard and stop from metallic material. Optionally it may be desirable to place a thin sheet of bearing material 53 such as teflon between the top flat surface 39 and the horizontal bottom surface 44 to prevent the two surfaces from galling and to enable the stop to be readily pivotable even though the safety device may be subjected to severe weather conditions.

The safety device 10 includes a locking means that is operable for preventing the stop 41 from pivoting about the vertical axis to prevent the front end 43 from being pivoted from the operative position. The locking means includes a locking lever or blade 55 having an upper end 56 and a lower end 57. The locking lever or blade 55 is pivotably mounted to the vertical section 46 of the stop substantially flush with the back surface 48 by bolt 60 that extends through the lever and the vertical section 46. The pivot bolt is held in place by nut 61. The bolt 60 extends through the locking lever 55 adjacent to end 56. The bolt 60 defines a horizontal pivot axis about which the locking lever is pivoted. Because of the offset, the lower end 57 is biased downward by gravity. When the stop 41 is in an operative or locking position the locking lever 55 extends downward flush with the back vertical surface 35 to engage the standard to prevent the stop 41 from being pivoted in either direction from the operative position.

To facilitate the ease of pivotal movement of the locking lever 55, optionally a thin sheet of bearing material 64 such as teflon may be positioned between the back vertical surface 48 and the locking lever 55.

To prevent the socket 24 from disengaging from the ball 15 the stop 41 is pivoted to the operative position with the front end 43 extending directly over the socket 24 to prevent the socket from lifting off the ball 15. The locking lever 55 is pivoted to the down or locking position as is illustrated by the solid line in FIG. 1. The locking lever 55 is maintained in the locking position by gravity.

When it is desired to disconnect the hitch, the locking lever 55 is pivoted upward to the unlocking position shown in the dotted line in FIG. 1 to enable the stop 41 to be pivoted about the vertical axis defined by the bolt 50. The front end 43 is then pivoted from the operative position to enable the socket to be lifted off the ball.

It should be noted that the distance from the horizontal pivot axis defined by the bolt 60 and the upper end 56 is less than the distance from the horizontal pivot axis to the plane separating the surfaces 44 and 39. The distance from the horizontal pivot axis to the lower end 57 is substantially greater than the distance from the horizontal pivot axis to the plane separating surfaces 39 and 44.

It should be understood that the above described embodiment is simply illustrative of the principles of this invention and numerous other embodiments can be readily devised without deviating therefrom. Therefore, only the following claims are intended to define this invention.

What I claim is:

1. A safety device for a hitch of the type having a hitch bracket secured to the rear of a towing vehicle supporting a ball, and a ball receiving socket secured to the front of a towed vehicle to prevent the ball and socket from inadvertently disengaging and thereby prevent the inadvertent disconnection of the towed vehicle from the towing vehicle, said safety device comprising:
   a support standard for being rigidly secured to the hitch bracket spaced from the ball;
   a stop supported on the standard section for pivotal movement about a substantially vertical axis between an operative position in which the stop extends directly over the ball and socket to prevent the socket from disengaging from the ball and an inoperative position in which the stop does not extend directly over the ball and socket to enable the socket to be readily disengaged from the ball; and
   a selectively releasable locking means having a locking lever supported on the support standard for pivotal movement between a locking position in which the locking lever prevents the stop from pivoting from the operative position and an unlocking position in which the stop is free to pivot from the operative position to the inoperative position.

2. A safety device as defined in claim 1 wherein the support standard has a vertically disposed surface and wherein the stop has a vertically disposed surface that is vertically aligned with the standard vertical surface when the stop is in the operative position, said lever being pivotal about a substantially horizontal axis to enable the lever to be pivoted in a substantially vertical plane to abut both surfaces when the locking levers is in the locking position to prevent the stop from pivoting from the operative position.

3. The safety device as defined in claim 2 wherein the locking lever has two ends and wherein the horizontal axis is offset from a midpoint between the ends to bias one end downwardly by gravity to the locking position.

4. The safety device as defined in claim 3 wherein the locking lever is pivotally mounted to the vertical surface of the stop to enable the one end to be pivoted downward to abut the standard vertical surface when the stop is in the operative position and to be pivoted upward out of abutment with the standard vertical surface to enable the stop to be pivoted from the operative position.

5. A safety device for a hitch of a type having a horizontally disposed hitch bracket secured to the rear of a towing vehicle to support a ball and a ball receiving socket secured to the front of a towed vehicle to prevent the ball and socket from inadvertently disengaging and thereby prevent the inadvertent disconnection of the towed vehicle from the towing vehicle, said safety device comprising:
   a support standard for being rigidly secured in an upstanding orientation to the hitch bracket spaced from the ball;
   said support standard having an upper end and a back surface vertically extending to the upper end;
   a stop supported on the upper end of the standard for pivotal movement about a vertical axis to move a horizontally projecting end to and from an operative position directly overlying the ball and socket to prevent the disengagement of the socket from the ball;
   said stop having a rear end with a back vertical extending surface that lies in substantially the same plane as the standard back surface when the stop forward end is in the operative position.
   a locking lever mounted to the stop substantially flush with the stop back surface for pivotal movement about a horizontal axis adjacent one end of the lever to enable the other end to pivot vertically when the stop is in the operative position between a locking position in which the other end extends downward from the pivot axis flush with the standard back surface to prevent the stop from pivoting from the operative position and an unlocking position in which the other end extends upward from the pivot axis to enable the stop to be pivoted from the operative position.

6. A safety device as defined in claim 5 wherein the stop is L-shaped with one leg forming the horizontally projecting end and the other leg forming the rear end with the back vertical extending surface; said locking lever being pivotally mounted to the other leg substantially flush with the back surface of the other leg.

7. A safety device as defined in claim 5 wherein the standard, stop and lock lever are constructed of metal and wherein thin sheets of bearing material are positioned between the standard, stop and lock lever to enable the stop and lock lever to be readily pivotable.

* * * * *